United States Patent

[11] 3,594,051

| [72] | Inventor | Leonard A. Wells<br>Oklahoma City, Okla. |
|---|---|---|
| [21] | Appl. No. | 844,107 |
| [22] | Filed | July 23, 1969 |
| [45] | Patented | July 20, 1971 |
| [73] | Assignee | June M. Hicks<br>Oklahoma City, Okla. |

[54] WHEEL BEARING MOUNTING
3 Claims, 2 Drawing Figs.

| [52] | U.S. Cl. | 308/191 |
|---|---|---|
| [51] | Int. Cl. | F16c 13/02 |
| [50] | Field of Search | 308/191, 207.1, 189.1, 189, 210, 211 |

[56] References Cited
UNITED STATES PATENTS

| 1,245,094 | 10/1917 | Douthit | 308/210 |
|---|---|---|---|
| 1,754,892 | 4/1930 | Hughes | 308/191 |
| 2,618,521 | 11/1952 | Shields | 308/211 |
| 2,622,934 | 12/1952 | Phelps | 308/210 |

*Primary Examiner*—Martin P. Schwadron
*Assistant Examiner*—Frank Susko
*Attorney*—Dunlap, Laney, Hessin & Dougherty

ABSTRACT: The present invention relates to an improved wheel bearing mounting of the type wherein one or more axially preloaded antifriction wheel bearings supporting a wheel hub are axially secured on a spindle by a spindle nut. The wheel bearing mounting of the present invention includes a spindle nut having a pair of aligned openings in opposite sides thereof for mating with a cotterway disposed in the threaded portion of the spindle. The spindle nut is of a size such that when the nut is threaded on the spindle to the position where the pair of aligned openings therein mate with the cotterway in the spindle, the desired axial preload on said bearings is provided.

PATENTED JUL 20 1971　　　　　　　　　　　　　　3,594,051

INVENTOR
LEONARD A. WELLS

BY Dunlap, Laney, Hessin & Dougherty
ATTORNEYS

WHEEL BEARING MOUNTING

BACKGROUND OF THE INVENTION

1. Field of the Invention

The present invention relates to a wheel bearing mounting, and more particularly, but not by way of limitation, to a wheel bearing mounting having one or more antifriction wheel bearings secured on a spindle by a spindle nut.

2. Description of the Prior Art

The front wheels of vehicles such as automobiles and trucks are commonly mounted on one or more bearings which are secured on a spindle or axle by a standard hexagonal spindle nut. The spindle nut is threaded on the spindle and locked in position by a cotter pin. To maintain such wheels in proper axial position under heavy thrust loads, the wheels are usually mounted on a wheel hub supported on two axially spaced ball bearings of the angular contact type which are clamped together under axial preload on the spindle.

Heretofore, the wheel bearing mountings provided for the front wheels of trucks and automobiles have included a standard hexagonal spindle nut having three pairs of aligned grooves, or three cotterways, in the rearward end thereof. The three cotterways are positioned with the axis thereof intersecting the axis of the threaded bore in the nut, and are spaced at equal angles from each other. The spindles of these mountings are provided with a cotterway positioned in the threaded portion thereof at a predetermined distance from a shoulder provided on the opposite end of the spindle for axially locating the bearings thereon. In order to provide ample strength in the threaded connection between the spindle nut and the spindle, the interfitting threads have considerable depth and lead.

In mounting bearings and a wheel hub on the prior wheel bearing mounting assemblies, it is necessary to thread the spindle nut on the threaded portion of the spindle and tighten it to the point where the required preload is provided on the bearings. This is usually done at the factory with a torque wrench, and one of the cotterways in the rearward end of the spindle nut is aligned with the cotterway in the spindle at the precise torque required to provide the desired axial preload on the bearings.

Due to the depth and lead of the threads, after the spindle nut has been tightened on the spindle to position the bearings in a nonloaded tight relationship, only a very small further tightening of the nut is needed to produce the desired axial preload on the bearings. However, with the standard spindle nut heretofore used, it is often necessary to turn the nut as much as one-sixth of a rotation after it is initially tightened in order to align one of the cotterways therein with the cotterway in the spindle so that the nut may be locked in position by means of a cotter pin. When the bearings in these prior wheel bearing mountings are removed to be packed with grease, or replaced, quite often the mountings are reassembled without the use of a torque wrench, and even when a torque wrench is used, the spindle nut is loosened or tightened further in order to insert a cotter pin therein. Thus, the mountings are reassembled with too much or too little preload on the bearings. Also, the spindle nut is often threaded on the spindle to a position where one of the cotterways in the spindle nut mates with the cotterway in the spindle without regard to whether or not the proper preload is provided on the bearings. Furthermore, quite often the spindle nut is installed backwards on the threaded portion of the spindle. Consequently, a large number of front wheel bearings in automotive vehicles are assembled too loosely, thereby bringing about rapid wear and wheel wobble, or the bearings are installed too tightly, bringing about excessive stresses on the bearings causing premature failure thereof.

The present invention provides a wheel bearing mounting wherein the proper preload on the bearings is provided automatically upon assembly of the mounting, and the spindle nut cannot be installed backwards.

SUMMARY OF THE INVENTION

The present invention relates to a wheel bearing mounting having an angular contact antifriction wheel bearing secured on a spindle by a spindle nut, said spindle including a shoulder at one end for axially locating said bearing and a threaded portion at the opposite end for receiving the spindle nut. A cotterway is provided in the threaded portion of the spindle located a predetermined distance from the shoulder thereof. The spindle nut includes a pair of aligned openings in opposite sides thereof for mating with said cotterway positioned equidistant from the ends thereof. The spindle nut is of a size such that a predetermined required axial preload is provided on said bearing when said nut is positioned on said spindle with the pair of openings therein mated with said cotterway.

It is, therefore, an object of the present invention to provide an improved wheel bearing mounting.

A further object of the present invention is the provision of a wheel bearing mounting wherein the desired amount of axial preload is automatically provided on the wheel bearings when the mounting is assembled.

Yet a further object of the present invention is the provision of a wheel bearing mounting having one or more antifriction wheel bearings secured on a spindle by a spindle nut wherein the spindle nut can not be installed backwards.

Still a further object of the present invention is the provision of a wheel bearing mounting having one or more antifriction bearings secured on a spindle by a spindle nut wherein excessive preload can not be placed on the bearings inadvertently when the mounting is assembled.

Another object of the present invention is the provision of a wheel bearing mounting which cannot be properly assembled using worn out or defective bearings, or when the bearings or other parts thereof are installed incorrectly.

Other and further objects, features and advantages will be apparent from the following detailed description of presently preferred embodiments of the invention, given for the purpose of disclosure, and taken in conjunction with the accompanying drawings.

DESCRIPTION OF THE PREFERRED EMBODIMENTS

Figure 1:
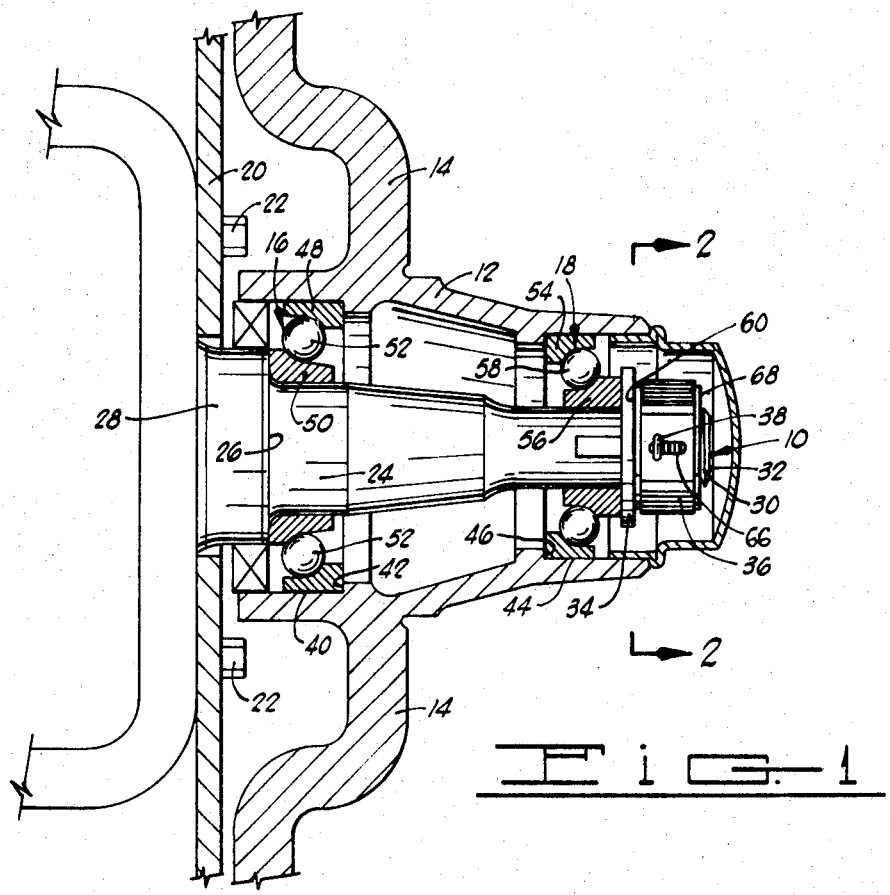
FIG. 1 is a fragmentary cross-sectional view of the improved wheel bearing mounting of the present invention with a pair of antifriction bearings and wheel hub mounted thereon.

Referring now to FIG. 1, the improved wheel bearing mounting of the present invention is illustrated and generally designated by the numeral 10. A conventional wheel hub 12 which includes a brake drum and wheel mounting flange 14, is rotatably supported on the wheel bearing mounting 10 by a pair of antifriction ball bearings 16 and 18 of the angular contact type. A conventional brake assembly 20 is attached to the wheel bearing mounting 10 by means of bolts 22.

The wheel bearing mounting 10 basically comprises a spindle 24, as the front wheel spindle in a motor vehicle, having a shoulder 26 at one end 28 thereof and a threaded portion 30 at the other end 32 thereof. A conventional nonrotatable thrust collar 34 is disposed over the end 32 of spindle 24, and a spindle nut 36, which will be described further hereinbelow, is threadedly secured on the threaded portion 30 of spindle 24 and locked in position by a conventional cotter pin 38.

The wheel hub 12 includes a rear counterbore 40 terminating at an annular shoulder 42, and a front counterbore 44 terminating at an annular shoulder 46. The bearing 16 has an outer race ring 48 and an inner race ring 50. The outer race ring 48 is seated in the counterbore 40 against the shoulder 42, and rotates with the hub 12. The inner race ring 50 of bearing 16 is seated on the rearward end 28 of spindle 24 against the shoulder 26. A plurality of balls 52 are positioned between race ring 48 and race ring 50, contacting the race rings 48 and 50 at an angle tending to resist axial thrust parallel to the axis of the spindle 24. The angular contact antifriction ball bearing 18, which may be smaller than the bearing 16 as illustrated in FIG. 1, has an outer race ring 54 and inner race ring 56. A plurality of balls 58 contact the race rings 54 and 56 of bearing 18 at an angle tending to resist axial thrust in directions parallel to the axis of the spindle 24. The outer race ring 54 of bearing 18 is seated within the counterbore 44 against the shoulder 46 of the wheel hub 12, and rotates with the hub 12. The inner race ring 56 is seated on the forward end 32 of the spindle 24. The bearing 18 has the balls 58 thereof in opposed angular race ring contact to that of the balls 52 of the bearing 16, and the wheel hub 12 supports the race rings 48 and 54 of the bearings 16 and 18 in axially spaced relation to each other. The inner race ring 50 of bearing 16 is axially supported against the shoulder 26 of spindle 24, and the inner race ring 56 of the bearing 18 is axially supported by the thrust collar 34 and spindle nut 36.

As will be understood, if the spindle nut 36 is tightened towards the shoulder 26 of spindle 24, the race rings of both the bearings 16 and 18 are brought into seating contact with the balls 48 and 58 thereof, and further tightening imparts a preload on both the bearings 16 and 18 due to the opposed angular contact relation of the bearings 16 and 18.

As will also be understood, after the sets of balls of bearings 16 and 18 have been initially brought together into race ring seating engagement, a very slight further tightening of the spindle nut 36 produces a very rapidly increasing preload of the balls against the race rings. Excessive preloading of the bearings 16 and 18 will cause excessive wear of the balls in the race rings, and premature failure of the bearings. If the bearings are allowed to remain loose, they allow wheel wobble to occur, again resulting in excessive wear and premature failure of the bearings.

A cotterway 62 is disposed in the threaded portion 30 of spindle 24 located at a predetermined distance from the shoulder 26. Since the wheel hubs and bearings presently used in automotive vehicles are manufactured in an extremely precisional manner, the exact distance between the shoulder 26 of the spindle 24 and the forward face 60 of the spindle nut 36 required to provide the precise preloading on the bearings 16 and 18 may be predetermined. The cotterway 62 is disposed in the forward end 32 of the spindle 24 at a point a distance from the shoulder 26 equal to the above-mentioned distance plus a standard additional distance to allow for the width of the spindle nut 36.

In order to overcome the problem of improper adjustment of the spindle nut 36, as frequently occurs in prior art wheel bearing mountings, the spindle nut 36 includes a pair of aligned openings 64 and 66 in opposite sides thereof for mating with the cotterway 62 in spindle 24. The openings 64 and 66 are positioned with the axis thereof equidistant from the ends 60 and 68 of spindle nut 36, and spindle nut 36 is of a predetermined width with respect to the position of the cotterway 62 in spindle 24. That is the distance from the axis of the opening 64 and 66 to either end of the spindle nut 36 is such that the desired preload on bearings 16 and 18 will be provided when openings 64 and 66 are mated with cotterway 62. Thus, when the spindle nut 36 is threaded on the threaded portion 30 of the spindle 24 to a position where the aligned openings 64 and 66 therein mate with the cotterway 62 disposed in the spindle 24, the desired predetermined preload will automatically be provided on the bearings 16 and 18. Since the aligned bores 64 and 66 are positioned precisely at a point which is equidistant between the ends 60 and 68 of the spindle nut 36, and the spindle nut 36 is of a predetermined width, it may be installed on the threaded portion 30 of spindle 24 with either the forward end 60 or the rearward end 68 adjacent to thrust collar 34. In either case the proper preload will be provided on the bearings 16 and 18 when the openings 64 and 66 therein are mated with the cotterway 62.

In the assembly of the wheel hub 12 and bearings 16 and 18 on the improved bearing mounting 10, if the bearings are installed incorrectly the spindle nut 36 will not readily thread on the spindle to the point where the openings 64 and 66 mate with the cotterway 62, and it will be obvious an error has been made. If the bearings 16 and 18 have been subjected to excessive wear, they will remain in a loose condition after spindle nut 36 has been positioned on the spindle 24 with the openings 64 and 66 mated with the cotterway 62 thereby allowing the wheel hub 12 to wobble. Thus, it will be known that the bearings 16 and 18 should be replaced if the wheel hub 12 wobbles after the wheel bearing mounting 10 has been assembled. Thus, by the present invention a bearing mounting is provided wherein the precise preload required on standard axially preloaded antifriction bearings is automatically obtained when the spindle nut 36 is positioned on the spindle 24 with the bores 64 and 66 thereof mated with the cotterway 62 disposed in spindle 24. A conventional cotter pin 38 may then be placed through the bores 64 and 66 of the spindle nut 36 and through the cotterway 62 of the spindle 24 to lock spindle nut 36 in position. Also, it may be seen that by the present invention, if the bearings 16 and 18 have been subjected to excessive wear, or if the bearing mounting or bearings have been assembled incorrectly this fact will come to the attention of a mechanic upon installation of the spindle nut 36 on the spindle 24.

Figure 2:
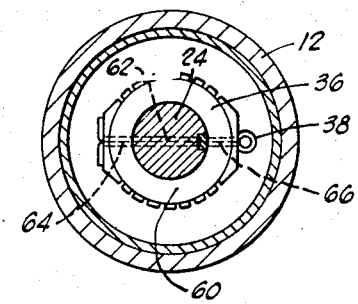
FIG. 2 is a view taken along lines 2-2 of FIG. 1.

As shown in FIGS. 1 and 2, the openings 64 and 66 in spindle nut 36 may be elliptical shape in cross section with the longest axis thereof extending parallel to the axis of the spindle nut 36. In this form, the nut 36 may be wider than when the openings are circular in cross section thereby increasing the number of threads contained in the nut and increasing the strength of the nut. In use, the spindle nut 36 is threaded on spindle 24 until the cotterway 62 of spindle 24 is uncovered by the forward portions of the elliptically shaped openings 64 and 66.

The present invention therefore is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention disclosed herein.

What I claim is:

1. A wheel bearing mounting having an angular contact antifriction wheel bearing secured on a spindle by a spindle nut, said spindle including a shoulder at one end for axially locating said bearing and a threaded portion at the opposite end for receiving said spindle nut, and having a cotterway in the threaded portion thereof located a predetermined distance from said shoulder, the improvement comprising:
    said spindle nut having a pair of aligned openings in opposite sides thereof for mating with said cotterway positioned equidistant from the ends thereof, and being of a size such that a predetermined required nonadjustable axial preload is provided on said bearing when said nut is positioned on said spindle with the pair of aligned openings therein mated with said cotterway.

2. A wheel bearing mounting comprising:
    a spindle having a shoulder at one end and a threaded portion at the opposite end, and having a cotterway in said threaded portion positioned transversely to the axis of said spindle a predetermined distance from said shoulder;
    an antifriction axially preloaded wheel bearing having a pair of rotatable race rings slidably positioned on said spindle with one of said race rings adjacent to said shoulder;
    a spindle nut threaded on the threaded portion of said spindle adjacent to the other of said race rings having a pair of aligned openings in opposite sides thereof for mating with said cotterway, said spindle nut being of a size such that when positioned on the threaded portion of said spindle with the pair of aligned openings thereof mated with said cotterway, the desired nonadjustable axial preload on said bearing is provided; and a cotter pin extending through said pair of aligned openings in said spindle nut and through said cotterway in said spindle for locking said spindle nut in position.

3. A wheel bearing mounting comprising:

a spindle having a shoulder at one end and a threaded portion at the opposite end, and having a cotterway in said threaded portion positioned transversely to the axis of said spindle a predetermined distance from said shoulder;

a pair of axially preloaded angular contact ball bearings, each of which is provided with an inner and outer race ring, slidably positioned on said spindle with the inner race ring of one of said bearings adjacent to said shoulder;

a rotatable wheel hub positioned on the outer race rings of said bearings and supporting said outer race rings in a predetermined axially spaced relation;

a nonrotatable thrust collar slidably mounted on said spindle adjacent to the inner race ring of the other of said bearings;

a spindle nut threaded on the threaded portion of said spindle adjacent to said thrust collar, said spindle nut having a pair of aligned openings in opposite sides thereof for mating with said cotterway, and being of a size such that when threaded on the threaded portion of said spindle with the pair of aligned openings thereof mated with said cotterway, the desired nonadjustable axial preload is provided on said bearing; and a cotter pin extending through said pair of aligned openings in said spindle nut and through said cotterway in said spindle for locking said spindle nut in position.